(12) United States Patent
Martini et al.

(10) Patent No.: US 9,813,394 B2
(45) Date of Patent: *Nov. 7, 2017

(54) MANAGE ENCRYPTED NETWORK TRAFFIC USING DNS RESPONSES

(71) Applicant: iboss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,392

(22) Filed: Dec. 16, 2016

(65) Prior Publication Data
US 2017/0099271 A1    Apr. 6, 2017

Related U.S. Application Data

(63) Continuation of application No. 14/848,219, filed on Sep. 8, 2015, now Pat. No. 9,525,660, which is a (Continued)

(51) Int. Cl.
*H04L 29/06* (2006.01)
*H04L 29/12* (2006.01)
*H04L 29/08* (2006.01)

(52) U.S. Cl.
CPC ........ *H04L 63/0464* (2013.01); *H04L 61/103* (2013.01); *H04L 61/1511* (2013.01); *H04L 67/02* (2013.01)

(58) Field of Classification Search
CPC .................. H04L 67/02; H04L 29/12066
See application file for complete search history.

(56) References Cited

U.S. PATENT DOCUMENTS 6,810,411 B1   10/2004   Coughlin et al.
2002/0078233 A1   6/2002   Biliris et al.
(Continued)

OTHER PUBLICATIONS

Herrada, "Capture Passwords on HTTPS (SSL) Using DNS Spoofing", Feb. 11, 2013, downloaded from the internet at: http://www.hacking-etic.cat/?p=278&lang=en on Oct. 25, 2013, 3 pages.
(Continued)

*Primary Examiner* — Dao Ho
(74) *Attorney, Agent, or Firm* — Fish & Richardson P.C.

(57) ABSTRACT

The present disclosure generally relates to managing encrypted network traffic using Domain Name System (DNS) responses. One example method includes requesting an address associated with the a domain name included in a predetermined set of domain names for which secure requests are to be identified; receiving a response from the resolution server including one or more addresses associated with the domain name; associating with the domain name a particular address selected from the received addresses; receiving a request to resolve the domain name; sending a response to the request to resolve the domain name including the particular address associated with the domain name; receiving a secure request for a resource, the secure request directed to the particular address associated with the domain name; and determining that the secure request is directed to the domain name based on the association between the particular address and the domain name.

18 Claims, 5 Drawing Sheets

Related U.S. Application Data continuation of application No. 14/280,513, filed on May 16, 2014, now Pat. No. 9,137,217.

(56) References Cited

U.S. PATENT DOCUMENTS

| | | |
|---|---|---|
| 2004/0098485 A1 | 5/2004 | Larson et al. |
| 2004/0215707 A1 | 10/2004 | Fujita |
| 2005/0055463 A1 | 3/2005 | Saunders et al. |
| 2006/0112176 A1 | 5/2006 | Liu et al. |
| 2008/0022013 A1 | 1/2008 | Adelman et al. |

OTHER PUBLICATIONS

Koponen, et al. "Secure Socket Layer (SSL) Man-in-the-middle attack", Apr. 18, 2001, downloaded from the internet at: http://sce.uhcl.edu/yang/teaching/csci5931webSecuritySpr04/secure%20Sockets%20Layer%20(SSL)%20Man-in-the-middle%20Attack.htm on Oct. 25, 2013, 4 pages.

MANAGE ENCRYPTED NETWORK TRAFFIC USING DNS RESPONSES

CROSS-REFERENCE TO RELATED APPLICATIONS

This application is a continuation application of and claims priority to U.S. application Ser. No. 14/280,513, filed on May 16, 2014.

BACKGROUND

This specification generally relates to managing encrypted network traffic using Domain Name System (DNS) responses.

In corporate and other networks, devices connected to the network may request resources on the network itself, or on external networks such as the Internet. These resources may include websites, file transfer services, servers, or other network resources. In some cases, this request may be made according to a secure protocol such as Hypertext Transfer Protocol Secure (HTTPS), Secure Socket Layer (SSL), Transport Level Security (TLS), or other protocols. The requested resources may be associated with domain names. A device may query a domain name server using the Domain Name System (DNS) protocol to determine an address corresponding to a given domain name.

SUMMARY

In general, one aspect of the subject matter described in this specification may be embodied in systems, and methods performed by data processing apparatuses that include the actions of requesting an address associated with a domain name from a resolution server, the domain name included in a predetermined set of domain names for which secure requests are to be identified; receiving a response from the resolution server including one or more addresses associated with the domain name; associating with the domain name a particular address selected from the received one or more addresses; receiving a request to resolve the domain name; sending a response to the request to resolve the domain name, the sent response including the particular address associated with the domain name; receiving a secure request for a resource, the secure request directed to the particular address associated with the domain name; and determining that the secure request is directed to the domain name based on the association between the particular address and the domain name.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
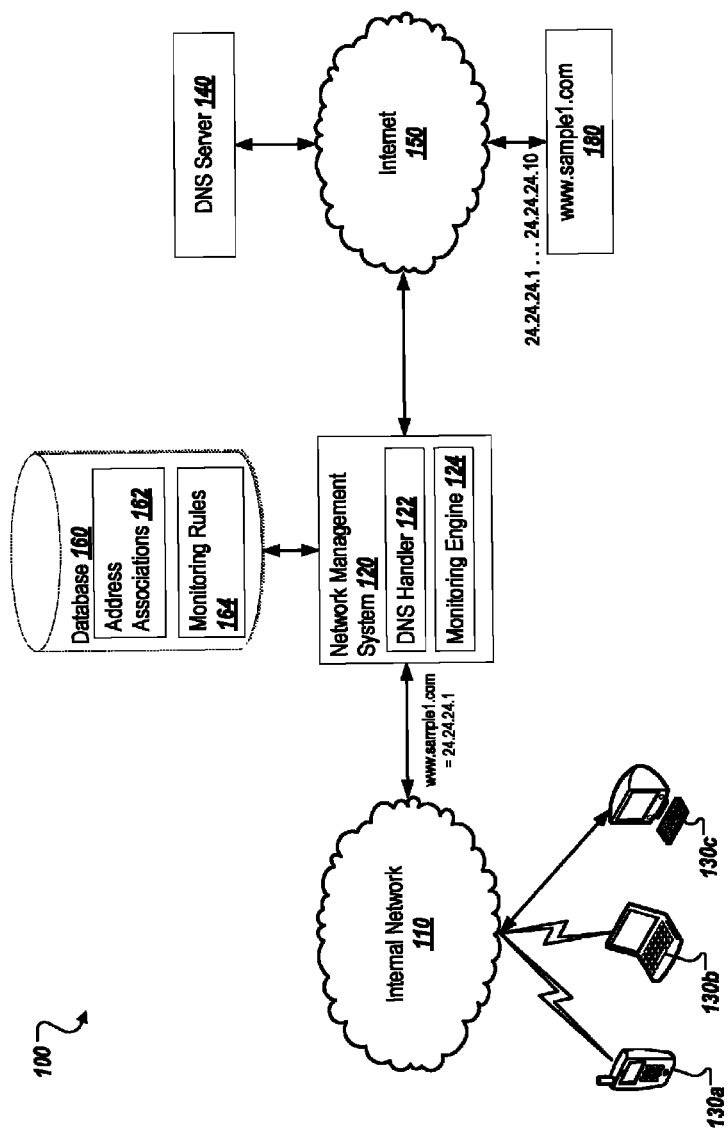
FIG. 1 is a diagram of an example environment.

In corporate and other networks, secure connections to resources on the Internet are often identified by either a certificate associated with the connection, such as an SSL certificate, or by the address associated with the connection. For certain Internet resources, such an approach can be problematic. For example, some larger network entities may use a master SSL certificate for all services they operate, such that the domain name assigned to the SSL certificate may be a wildcard domain such as "*.sample1.com." In such a case, managing access to individual services owned by the network entity may be difficult, as multiple services may share the same wildcard certificate. For example, a network owner desiring to block access to a video streaming site may inadvertently block access to a search engine owned by the same entity, as both sites may share the same certificate. Similarly, some network entities use shared addresses across services, such that blocking an address may have the same effect. When requests are made for network services using a secure protocol such as HTTPS, determining the address requested by the request may not be possible without decrypting the request.

Accordingly, the present disclosure describes techniques for managing secure network traffic using DNS responses. One example method includes associating a particular address with a particular domain name from a set of addresses associated with the domain name. For example, the particular address may be an Internet Protocol (IP) address selected from multiple IP addresses returned by a Domain Name Service (DNS) server for the domain name. The particular address may then be provided to network clients in response to DNS queries for the particular domain name. Subsequently, when a secure request directed to that particular address is received, the secure request can be determined to be directed to the particular domain name without decrypting the secure request. In this manner, the secure request can be selectively blocked based on the particular domain name. The secure request can also be selectively decrypted based on the particular domain name and its contents examined to determine how to handle the secure request.

The techniques described herein may provide several advantages. By associating the particular address with the domain name, a network owner may determine the domain name that a secure request is directed to without decrypting the secure request. Such functionality may allow a network owner to selectively apply security measures without decrypting, which affords greater privacy to users of the network. A network owner may also be able to block access to only certain services operated by a large network entity, as the techniques here do not rely on the domain name included in an SSL certificate to determine the destination for the request. Secure traffic may also be selectively decrypted, such that sensitive traffic, such as a user's personal email, may remain encrypted, while other non-sensitive encrypted traffic, such as requests for a video streaming site, may be decrypted and examined. Further, in cases where the same IP address is associated with multiple domain names owned by the same entity, the techniques described herein may be used to differentiate traffic directed to the different domain names without decrypting.

FIG. 1 is a diagram of an example environment 100. As shown, the example environment includes an internal network 110. A plurality of devices 130*a-c* are connected to the internal network 110. The example environment 100 also includes a network management system 120. The network management system 120 is connected to a database 160, and the Internet 150. A DNS server 140 and a website 180 are connected to the Internet 150.

In operation, the network management system 120 determines that a domain name is to be identified. In some implementations, the network management system 120 may consult the database 160 to determine that the domain name is included in a predetermined set of domain names to be identified. In some implementations, the network management system 120 may determine that a domain name is to be identified in response to a request sent from the devices 130*a-c* over the internal network 110 to resolve the domain name.

In some implementations, if the network management system 120 determines that the domain name is to be identified, the network management system 120 determines a particular address to associate with the domain name. The particular address may be an IP address, an IP address and port combination, or another type of address.

In some cases, the network management system 120 may consult the database 160 to determine the particular address. For example, the database 160 may include an association of the domain name and a particular address. The association may be determined from previous requests to resolve the domain name and stored in the database 160. The network management system 120 may also select the particular address based on a response from a resolution server. A resolution server may provide one or more addresses that are associated with a domain name. In some implementations, a resolution server may be a DNS server. In the illustrated example, the network management system 120 may send a request to the DNS server 140. In some implementations, the request may be a DNS request. In response to the request, the DNS server 140 sends a response to the network management system 120. In some implementations, the response may be a DNS response. The response may include one or more addresses associated with the domain name. The network management system 120 may select a particular address from the one or more addresses in the response and, associate with the domain name the particular address. In some implementations, the network management system 120 may select more than one particular address from the one or more addresses in the response and associate the selected addresses with the domain name.

In some implementations, the devices 130*a-c* may send a request, such as a DNS request, over the internal network 110 to resolve the domain name. Upon determining the particular address associated with the domain name, the network management system 120 may send a response, such as a DNS response, to the requesting device including the particular address associated with the domain name. Upon receiving the particular address, the requesting device may send a secure request directed to the particular address. In some implementations, the secure request may be a request formatted according to the HTTPS protocol. In some implementations, the network management system 120 may receive the secure request. The network management system 120 may then determine from the particular address a domain name associated with the secure request. Such a determination is usually not possible without decrypting the secure request, because the requested domain name is included within the encrypted payload. However, by associating the particular address with the domain name when processing the DNS query, the network management system 120 may determine that a secure request to the particular address is directed to the domain name without decrypting the secure request.

In some implementations, the network management system 120 may selectively decrypt the received secure request based on one or more monitoring rules 164 stored in the database 160. The network management system 120 may examine the contents of the secure request after decrypting in order to determine how to handle the secure request. For example, the network management system 120 may forward or block the received secure request based on the contents of the decrypted request. In some implementations, the network management system 120 may determine whether to forward or block the secure request without decrypting the request.

As shown, the example environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 110 in such configurations, the device still may be required to authenticate in order to access resources on the internal network 110 and/or on the Internet 150. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

The example environment 100 also includes one or more devices 130*a-c* connected to internal network 110. In some implementations, the one or more devices 130*a-c* include mobile devices, such as cellular telephones (e.g., 130*a*), smartphones, tablets, laptops (e.g., 130*b*) and other similar computing devices. The one or more devices 130*a-c* may also include wired devices such as desktop computer 130*c*. The one or more devices 130*a-c* may also include servers. In some implementations, the one or more devices 130*a-c* include personal devices associated with one or more users. The one or more devices 130*a-c* may also include devices issued or owned by the entity that provides the internal network 110, such as company-issued smartphones or laptops. In some implementations, the one or more devices 130*a-c* may include network access or web browsing software (e.g., a web browser) for accessing resources on the Internet 150.

The network management system 120 is connected to the internal network 110. As described above, the network management system 120 may be operable to receive DNS queries from the one or more devices 130*a-c*, selectively return particular addresses in response to the DNS queries, and monitor secure requests sent by the one or more devices 130*a-c* directed to the Internet 150. In some implementations, the network management system may be a server or set of servers connected to the internal network 110. The network management system 120 may be configured as a gateway between the internal network 110 and the Internet 150, such that traffic directed to the Internet 150 passes through the network management system 120. The network management system 120 may also be configured to passively monitor traffic on the internal network 110, such as in a tap or span configuration. In some implementations, the network management system 120 may receive part of the traffic directed to the Internet 150, such that traffic directed to domain names to be identified passes through the network management system 120, the traffic directed to domain names that are not to be identified does not pass through the network management system 120. In some implementations, the DNS functionality and the monitoring functionality of the network management system 120 may be implemented on separate servers in communication and coordination with one another.

The network management system 120 includes a DNS handler 122. In operation, the DNS handler 122 may receive DNS requests from the one or more devices 130*a-c* connected to the internal network 110. The DNS handler 122 may consult monitoring rules 164 stored in the database 160 (discussed below) to determine whether to select a particular address in response to a particular DNS query. For example, the monitoring rules 164 may specify that all traffic to the domain name "www.sample1.com" should be identified. In such a configuration, the DNS handler 122 may respond to a DNS request to resolve the domain name "www.sample1.com" with a particular address. In some implementations, the particular address may be one or more addresses associated with the domain name "www.sample1.com." For example, the domain name "www.sample1.com" may be associated with addresses "24.24.24.1 . . . 24.24.24.10" as shown in FIG. 1. In such a case, the addresses "24.24.24.1 . . . 24.24.24.10" may be included in a DNS response for the domain name "www.sample1.com" from the DNS server 140. The DNS handler 122 may select the address "24.24.24.1" as the particular address associated with "www.sample1.com." The DNS handler 122 may note this association between the domain name from the DNS query and the returned particular address in the database 160 (described below) as an address association 162. The DNS handler 122 may consult with address associations 162 in the database 160 to determine the particular address associated with the "www.sample1.com."

In some implementations, if the DNS handler 122 determines that the domain name in a DNS request is not to be identified, the DNS handler 122 may return some or all of the addresses associated with the requested domain name. For example, in response to a request for an address corresponding to "www.sample1.com" in the situation that that domain name was not being identified, the DNS handler 122 may return all the addresses corresponding to the website 180 (e.g., "24.24.24.1 . . . 24.24.24.10"). In some implementations, the DNS handler 122 may cache these DNS entries and provide information in the cached entries in response to DNS requests for domain names that are not to be identified.

The network management system 120 also includes a monitoring engine 124. In operation, the monitoring engine 124 receives secure requests from the one or more devices 130*a-c* that are directed to the particular addresses. The monitoring engine 124 may consult the address associations 162 in the database 160 (described below) to determine a domain name associated with the secure request received on a particular address. Based on the domain name, the monitoring engine 124 may determine how to handle the secure request. For example, the monitoring engine 124 may identify a monitoring rule 164 associated with the domain name "www.sample1.com." The monitoring engine 124 may receive a secure request directed to "24.24.24.1," the particular address associated with the domain name "www.sample1.com." The monitoring engine 124 may determine that the monitoring rule 164 associated with this domain name indicates that the monitoring engine 124 should forward the secure request on to the server associated with the domain name. In response, the monitoring engine 124 may forward the secure request to the website 180 associated with the particular address (e.g., "24.24.24.1"). If the monitoring engine 124 determines that the monitoring rule 164 indicates that the request should be blocked, the monitoring engine 124 may block the request. In some implementations, the monitoring engine 124 may send a redirect response to the request. In some implementations, the redirect response may include an address associated with a block notification page.

In some implementations, the monitoring engine 124 may selectively decrypt secure requests received on the particular addresses based on the monitoring rules 164. Based on the contents of the decrypted secure request, the monitoring engine 124 may forward, block, or otherwise handle the secure request. For example, the monitoring engine 124 may examine the headers of the decrypted secure request, and determine that the request has a referrer header prohibited by the associated monitoring rule 164. In response, the monitoring engine 124 may block the secure request. In some implementations, the monitoring engine 124 may modify the decrypted secure request based on the monitoring rules 164. For example, the monitoring engine 124 may replace the referrer header in the secure request with a different referrer header. The monitoring engine 124 may then re-encrypt the decrypted secure request, and forward it to the website 180 associated with the particular address (e.g., "24.24.24.1").

Although the DNS handler 122 and the monitoring engine 124 are shown as separate components, in some implementations the two components may be combined. In some cases, the two components may be separate modules within a single software process. The DNS handler 122 and monitoring engine 124 may also be located on separate servers connected to the internal network 110. The monitoring engine 124 may be in communication with one or more monitoring servers to which secure requests to a particular address are sent. The monitoring servers may communicate with the monitoring engine 124 in order to determine how to handle secure requests received.

The database 160 is connected to the network management system 120. In some implementations, the database 160 may be stored on the same server as the network management system 120. The database 160 may also be stored on a separate server and accessed by the network management system 120 over a network. The database 160 may be any proprietary or commercially available database system or format, including, but not limited to, MySQL®, Microsoft® SQLServer, IBM® DB2, Oracle®, SQLite, or any other suitable database system or format. The database 160 may also be a distributed database running on a plurality of servers. In some implementations, the database 160 may be a configuration file or set of configuration files associated with the network management system 120.

The database 160 includes address associations 162. In some implementations, the address associations 162 are stored in one or more database tables mapping domain names to particular addresses. In some implementations, the particular address may be an IP address, an IP address and port combination, or another type of address. In some implementations, the particular addresses are unique such that any particular address is associated with one domain name. For example, the domain name "www.sample1.com" is associated with the particular address "24.24.24.1" as shown in FIG. 1. This association may be stored in the address associations 162. If the DNS handler 122 receives a response from the DNS server 140 indicating that the domain name "www.sample2.com" is associated with addresses "24.24.24.1 . . . 24.24.24.5," the DNS handler 122 may consult with the address association 162 and remove the address "24.24.24.1" from the list of addresses provided by the DNS server 140. The DNS handler 122 may select one or more addresses in "24.24.24.2 . . . 24.24.24.5" as the particular addresses associated with the domain name "www.sample2.com" and send a response to the requesting device including the selected particular addresses.

Database 160 also includes monitoring rules 164. In some implementations, the monitoring rules 164 may specify actions to be performed for traffic directed to a particular domain name. For example, a monitoring rule 164 may specify that traffic for the domain name "www.sample1.com" should be directed to a particular address, that all the traffic directed to the domain name "www.sample1.com" be decrypted, and traffic including a referrer header of "www.badguy.com" should be blocked.

The DNS server 140 receives requests from the network management system 120. The requests may include queries to resolve domain names. In response to the requests, the DNS server 140 sends responses to the network management system 120. The responses may include one or more addresses associated with the domain name. In the illustrated example, the DNS server 140 is connected to the Internet 150. The DNS server 140 may also be a local DNS sever connected to the internal network 110. The DNS server 140 may also forward the requests to other DNS servers to resolve the domain names and, forward the received responses back to the network management system 120. In some cases, the DNS server 140 may be a server controlled by an entity other than the owner of the internal network 110.

Figure 2:
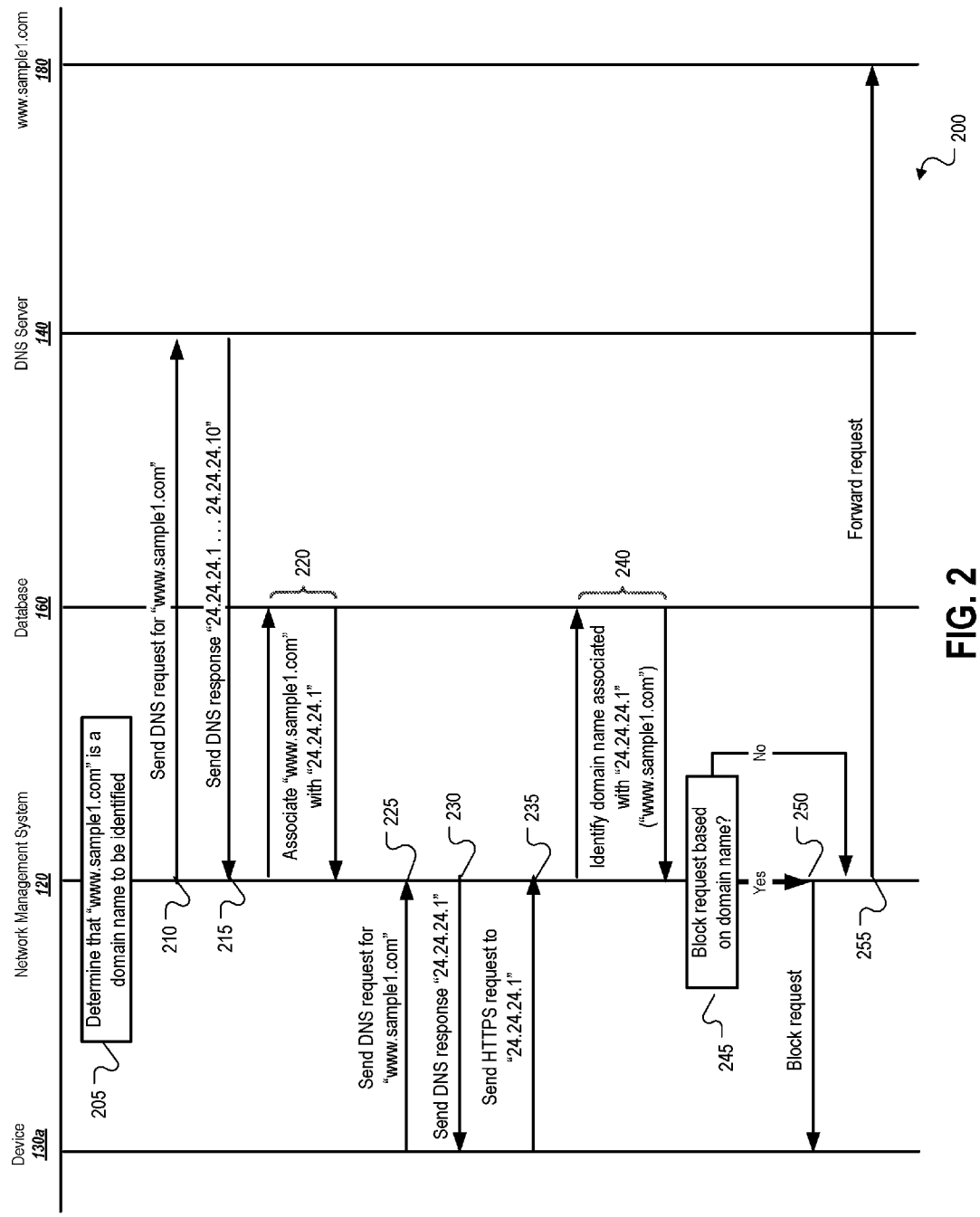
FIG. 2 is a message flow diagram of an example interaction between the components of the example environment to selectively block a secure request using DNS responses.

FIG. 2 is a message flow diagram of an example interaction between the components of the example environment to selectively block a secure request using DNS responses. At 205, the network management system 120 determines that "www.sample1.com" is a domain name to be identified. The network management system 120 consults the database 160 to determine that "www.sample1.com" is included in a predetermined set of domain names to be identified. In some cases, the network management system 120 determines that "www.sample1.com" is a domain name to be identified in response to a request from the device 130a to resolve the domain name "www.sample1.com."

At 210, the network management system 120 sends a DNS request for "www.sample1.com" to the DNS server 140. At 215, the DNS server 140 sends a DNS response including the addresses "24.24.24.1 . . . 24.24.24.10" that are associated with "www.sample1.com." At 220, the network management system 120 interacts with the database 160 to associate the domain name "www.sample1.com" with the particular address "24.24.24.1." The particular address "24.24.24.1" is selected from the addresses "24.24.24.1 . . . 24.24.24.10" included in the DNS response received from the DNS server 140 (at 215). In some implementations, the network management system 120 inserts a new row into a table storing the address associations 162 (shown in FIG. 1). Selecting the particular address may include removing an address that is associated with other identified domain names from the addresses included in the DNS response received from the DNS server 140.

At 225, the device 130a sends a DNS request for "www.sample1.com" to the network management system 120. As previously described, this may also occur prior to 205, which can be performed in response to receiving a DNS request. At 230, the network management system 120 sends a DNS response including the particular address "24.24.24.1" associated with "www.sample1.com." At 235, the device 130a sends an HTTPS request for "www.sample1.com" to the particular address "24.24.24.1." In some implementations, the request may be sent using a secure protocol other than HTTPS.

At 240, the network management system 120 consults the database 160 to identify the domain name associated with "24.24.24.1." In some implementations, the network management system 120 may query the address associations 162 (shown in FIG. 1) in the database 160 to determine that "www.sample1.com" is associated with "24.24.24.1."

At 245, the network management system 120 determines whether the request should be blocked. In some implementations, the network management system 120 may consult the database 160 for a monitoring rule 164 (shown in FIG. 1) associated with "www.sample1.com." If the network management system 120 determines that the request should be blocked, at 250, the network management system 120 blocks the request. In some implementations, as described previously, blocking the request may include sending a redirect response to the device 130a. Blocking the request may also include sending a response to the secure request, such as, for example, a Hypertext Markup Language (HTML) page indicating that the request was blocked. In some implementations, the redirect response may include an address associated with such a block notification page. Blocking the request may also include dropping the request. If the network management system 120 determines that the request should not be blocked, at 255, the network management system 120 forwards the request to the website 180 corresponding to the domain name "www.sample1.com."

Figure 3:
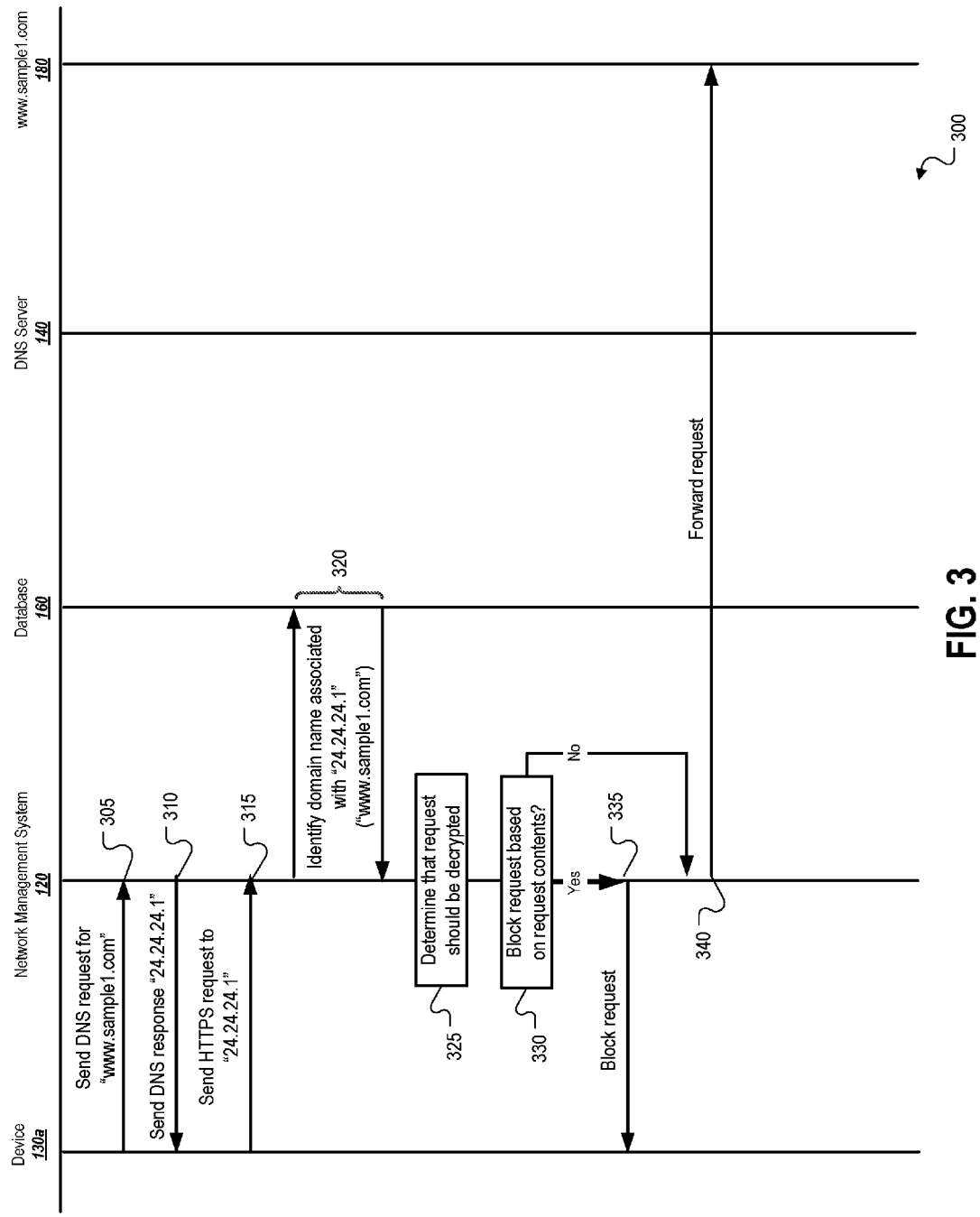
FIG. 3 is a message flow diagram of an example interaction between the components of the example environment to selectively decrypt a secure request using DNS responses.

FIG. 3 is a message flow diagram of an example interaction between the components of the example environment to selectively decrypt a secure request using DNS responses. At 305, the device 130a sends a DNS request for "www.sample1.com" to the network management system 120. At 310, the network management system 120 sends a DNS response including the particular address "24.24.24.1" associated with "www.sample1.com." In some implementations, as described previously, the network management system 120 may determine the particular address "24.24.24.1" based on a response from the DNS server 140. The network management system 120 may determine the particular address "24.24.24.1" by consulting with the database 160.

At 315, the device 130a sends an HTTPS request for "www.sample1.com" to the particular address "24.24.24.1." In some implementations, the request may be sent using a secure protocol other than HTTPS. At 320, the network management system 120 consults the database 160 to identify the domain name associated with "24.24.24.1." In some cases, the network management system 120 may query the address associations 162 (shown in FIG. 1) in the database 160 to determine that "www.sample1.com" is associated with "24.24.24.1."

At 325, the network management system 120 determines that the request should be decrypted. The network management system 120 may consult the database 160 for a monitoring rule 164 (shown in FIG. 1) associated with "www.sample1.com" to determine that the request should be decrypted. At 330, the network management system 120 decrypts the request and examines its contents to determine whether the request should be blocked. If the network management system 120 determines that the request should be blocked, at 335, the network management system 120 blocks the request. In some implementations, as described previously, blocking the request may include sending a redirect response to the device 130a. The redirect response may include an address associated with a block notification page. In some cases, blocking the request may include dropping the request. If the network management system 120 determines that the request should not be blocked, at 340, the network management system 120 forwards the request to the website 180 corresponding to the domain name "www.sample1.com." In some implementations, as described previously, the network management system 120 may modify the decrypted secure request and re-encrypt the modified secure request.

Figure 4:
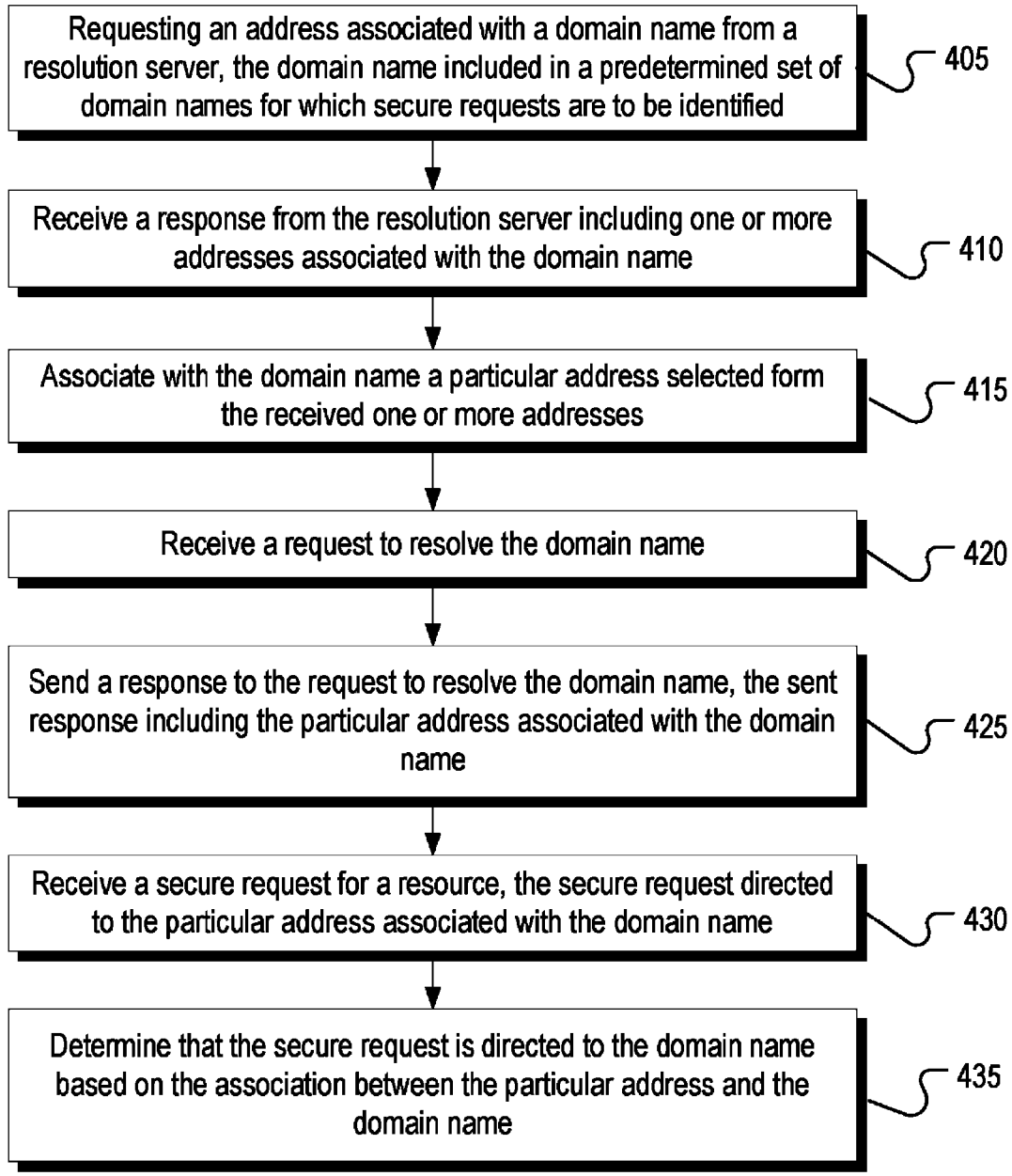
FIG. 4 is a flow chart of an example process of managing encrypted network traffic using DNS responses.

FIG. 4 is a flow chart of an example process 400 of managing encrypted network traffic using DNS responses. At 405, an address associated with a domain name from a resolution server is requested. In some implementations, the request may be sent in a DNS request. In some implementations, the domain name may be included in a predetermined set of domain names for which secure requests are to be identified. In some implementations, the request may be performed in response to receiving a request to resolve the domain name. At 410, a response from the resolution server including one or more addresses associated with the domain name is received. In some implementations, the response may be received in a DNS response.

At 415, the domain name is associated with a particular address selected from the received one or more addresses. In some implementations, the association may be made by consulting a database (e.g., 160). In some cases, the particular address may be an IP address, an IP address and port combination, or another type of address.

At 420, a request to resolve the domain name is received. In some implementations, the request to resolve the domain name may be a DNS request. At 425, a response to the request to resolve the domain name is sent. In some implementations, the response may be sent in a DNS response. In some implementations, the sent response may include the particular address associated with the domain name.

At 430, a secure request for resource is received. The secure request may be directed to the particular address associated with the domain name. In some implementations, the secure request may be an HTTPS request. At 435, a determination is made that the secure request is directed to the domain name based on the association between the particular address and the domain name. In some implementations, the secure request is selectively blocked based at least in part on determining that the secure request is directed to the domain name. In some implementations, the secure request is selectively decrypted based at least in part on determining that the secure request is directed to the domain name. In some implementations, selectively decrypting the secure request may include determining that the secure request should be decrypted based at least in part on one or more rules, and decrypting the secure request to generate decrypted information. In some implementations, the decrypted information may be inspected in order to determine whether to forward, block, and/or modify the secure request. In some implementations, the modified decrypted information may be re-encrypted before forwarded to an address associated with the domain name. In some implementations, blocking the secure request includes sending a redirect response to the secure request. In some implementations, the redirect response includes an address associated with a block notification page. In some implementations, blocking the request may include dropping the request.

Receiving the secure request may include establishing a first secure connection with a sender of the secure request, and establishing a second secure connection with an address associated with the resource after establishing the first secure connection with the sender. Such an approach is generally known as a "client first" procedure.

In some implementations, receiving the secure request may include establishing a first secure connection with an address associated with the resource, and establishing a second secure connection with a sender of the secure request after establishing the first secure connection with the address associated with the resource. Such an approach is generally known as a "server first" procedure.

In some cases, a request to resolve a second domain name different than the first domain name is received. A determination is made that the second domain name is not included in the predetermined set of domain names and, a response to the request to resolve the second domain name is sent including an address corresponding to the second domain. In some implementations, if the second domain name is not included in the predetermined set of domain names, the request to resolve the second domain name may be forwarded to a resolution server, and the response from the resolution server may be forwarded back to the requester.

The domain name may be a first domain name and an address associated with a second domain name different than the first domain name may be requested. A second response from the resolution server may be received. The second response may include one or more addresses associated with the second domain name, where the one or more addresses associated with the second domain name may include the particular address associated with the first domain name. In some implementations, the second response may be modified to remove the particular address associated with the first domain name.

In some implementations, a second request to resolve the domain name is received. A determination is made that the domain name is associated with the particular address, and a response is sent to the second request to resolve the domain name, where the response includes the particular address.

Figure 5:
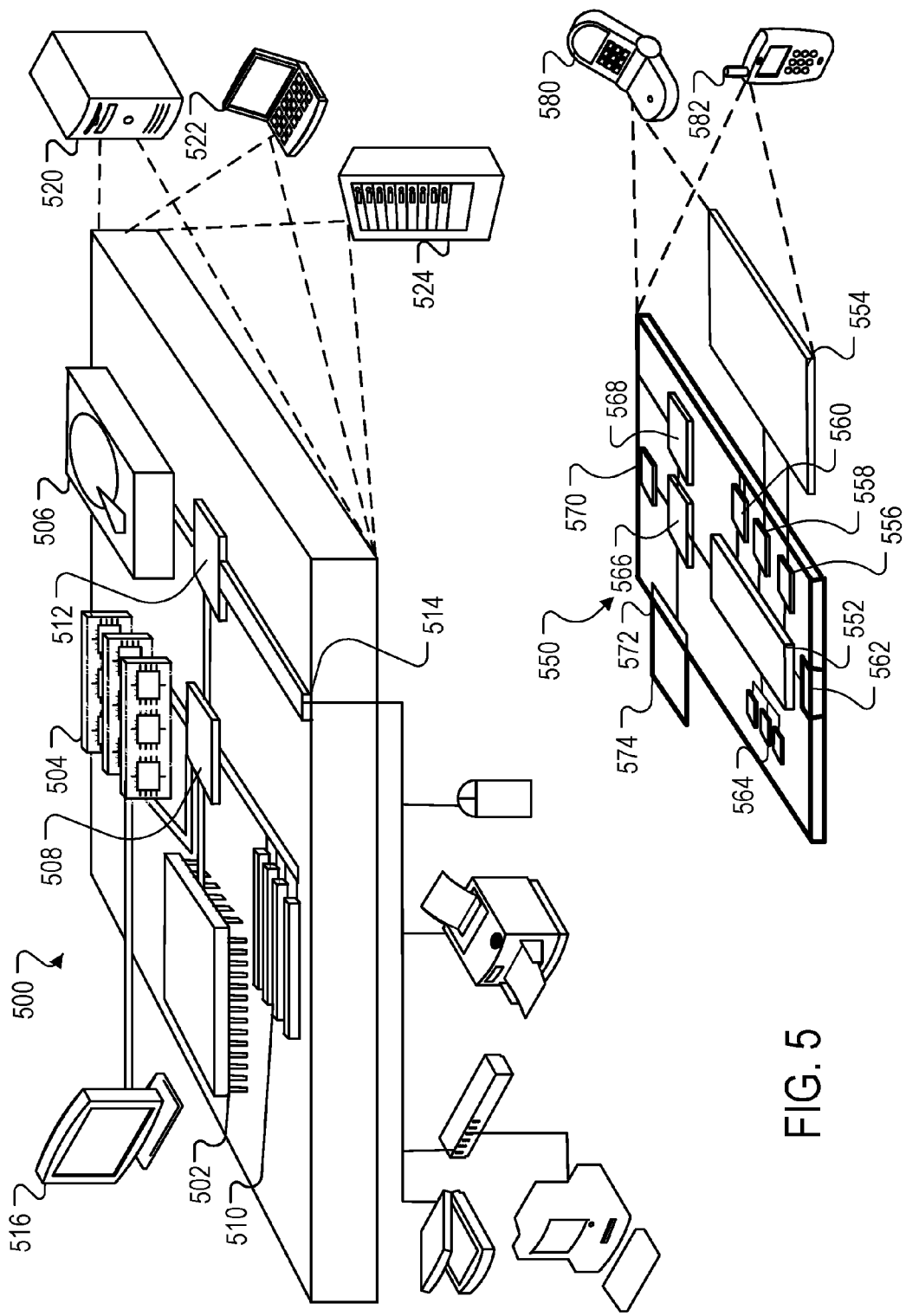
FIG. 5 is a diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
    requesting an address associated with a domain name from a resolution server, the domain name included in a predetermined set of domain names for which secure requests are to be identified;
    receiving a response from the resolution server including one or more addresses associated with the domain name;
    associating with the domain name a particular address selected from the received one or more addresses;
    receiving a request to resolve the domain name;
    sending a response to the request to resolve the domain name, the sent response including the particular address associated with the domain name;
    receiving a secure request for a resource, the secure request directed to the particular address associated with the domain name;
    determining that the secure request is directed to the domain name based on the association between the particular address and the domain name;
    selectively decrypting the secure request based at least in part on determining that the secure request is directed to the domain name, wherein selectively decrypting the secure request includes determining that the secure request should be decrypted based at least in part on one or more rules, and decrypting the secure request to generate decrypted information;

inspecting the decrypted information;
determining that the secure request should be forwarded based at least in part on inspecting the decrypted information and at least in part on the one or more rules;
modifying the decrypted information based at least in part on the one or more rules;
encrypting the decrypted information to produce a second secure request; and
forwarding the second secure request to an address associated with the domain name.

2. The method of claim 1, wherein the domain name is a first domain name, the method further comprising:
requesting an address associated with a second domain name different than the first domain name from the resolution server;
receiving a second response from the resolution server including one or more addresses associated with the second domain name, wherein the one or more addresses associated with the second domain name includes the particular address; and
modifying the second response to remove the particular address.

3. The method of claim 1, wherein:
the particular address includes an internet protocol (IP) address, requesting the address associated with the domain name from the resolution server includes sending a Domain Name System (DNS) request;
receiving the response from the resolution server includes receiving a DNS response;
receiving the request to resolve the domain name includes receiving a DNS request; and
sending the response to the request to resolve the domain name includes sending a DNS response.

4. The method of claim 1, further comprising:
inspecting the decrypted information;
determining that the secure request should be forwarded based at least in part on inspecting the decrypted information and at least in part on the one or more rules; and
forwarding the secure request to an address associated with the domain name.

5. The method of claim 4, wherein forwarding the secure request comprises:
re-encrypting the secure request; and
sending the secure request to the address associated with the domain name.

6. The method of claim 1, further comprising:
inspecting the decrypted information;
determining that the secure request should be blocked based at least in part on inspecting the decrypted information and at least in part on the one or more rules; and
blocking the secure request.

7. The method of claim 6, wherein blocking the secure request includes sending a redirect response to the secure request, the redirect response including an address associated with a block notification page.

8. The method of claim 1, wherein receiving the secure request for the resource comprises:
establishing a first secure connection with a sender of the secure request; and
establishing a second secure connection with an address associated with the resource after establishing the first secure connection with the sender.

9. The method of claim 1, wherein receiving the secure request for the resource comprises:
establishing a first secure connection with an address associated with the resource; and
establishing a second secure connection with a sender of the secure request after establishing the first secure connection with the address associated with the resource.

10. The method of claim 1, wherein the domain name is a first domain name, the method further comprising:
receiving a request to resolve a second domain name different than the first domain name;
determining that the second domain name is not included in the predetermined set of domain names; and
sending a response to the request to resolve the second domain name, the response including an address corresponding to the second domain name.

11. The method of claim 1, further comprising:
receiving a second request to resolve the domain name;
determining that the domain name is associated with the particular address; and
sending a response to the second request to resolve the domain name, the response including the particular address.

12. The method of claim 1, wherein receiving the secure request for the resource includes receiving a request according to Hypertext Transfer Protocol Secure (HTTPS).

13. The method of claim 1, further comprising selectively blocking the secure request based at least in part on determining that the secure request is directed to the domain name.

14. The method of claim 1, wherein requesting the address for the domain name from the resolution server, receiving the response from the resolution server, and associating with the domain name the particular address are performed in response to receiving the request to resolve the domain name.

15. A system comprising:
memory for storing data; and
one or more processors operable to perform operations comprising:
requesting an address associated with a domain name from a resolution server, the domain name included in a predetermined set of domain names for which secure requests are to be identified;
receiving a response from the resolution server including one or more addresses associated with the domain name;
associating with the domain name a particular address selected from the received one or more addresses;
receiving a request to resolve the domain name;
sending a response to the request to resolve the domain name, the sent response including the particular address associated with the domain name;
receiving a secure request for a resource, the secure request directed to the particular address associated with the domain name;
determining that the secure request is directed to the domain name based on the association between the particular address and the domain name;
selectively decrypting the secure request based at least in part on determining that the secure request is directed to the domain name, wherein selectively decrypting the secure request includes determining that the secure request should be decrypted based at least in part on one or more rules, and decrypting the secure request to generate decrypted information;
inspecting the decrypted information;

determining that the secure request should be forwarded based at least in part on inspecting the decrypted information and at least in part on the one or more rules;

modifying the decrypted information based at least in part on the one or more rules;

encrypting the decrypted information to produce a second secure request; and forwarding the second secure request to an address associated with the domain name.

16. The system of claim 15, wherein the domain name is a first domain name, the operations further comprising:

requesting an address associated with a second domain name different than the first domain name from the resolution server;

receiving a second response from the resolution server including one or more addresses associated with the second domain name, wherein the one or more addresses includes the particular address; and modifying the second response to remove the particular address.

17. The system of claim 15, the operations further comprising:

the particular address includes an internet protocol (IP) address, requesting the address associated with the domain name from the resolution server includes sending a Domain Name System (DNS) request;

receiving the response from the resolution server includes receiving a DNS response;

receiving the request to resolve the domain name includes receiving a DNS request; and sending the response to the request to resolve the domain name includes sending a DNS response.

18. A non-transitory, computer-readable medium storing instructions operable when executed to cause at least one processor to perform operations comprising:

requesting an address associated with a domain name from a resolution server, the domain name included in a predetermined set of domain names for which secure requests are to be identified;

receiving a response from the resolution server including one or more addresses associated with the domain name;

associating with the domain name a particular address selected from the received one or more addresses;

receiving a request to resolve the domain name;

sending a response to the request to resolve the domain name, the sent response including the particular address associated with the domain name;

receiving a secure request for a resource, the secure request directed to the particular address associated with the domain name;

determining that the secure request is directed to the domain name based on the association between the particular address and the domain name;

selectively decrypting the secure request based at least in part on determining that the secure request is directed to the domain name, wherein selectively decrypting the secure request includes determining that the secure request should be decrypted based at least in part on one or more rules, and decrypting the secure request to generate decrypted information;

inspecting the decrypted information;

determining that the secure request should be forwarded based at least in part on inspecting the decrypted information and at least in part on the one or more rules;

modifying the decrypted information based at least in part on the one or more rules;

encrypting the decrypted information to produce a second secure request; and forwarding the second secure request to an address associated with the domain name.

* * * * *